United States Patent [19]
Hobson et al.

[11] Patent Number: 5,335,692
[45] Date of Patent: Aug. 9, 1994

[54] VALVE HAVING ROTATABLE CAGE

[75] Inventors: David J. Hobson, Loveland; Everett DeJager, Cincinnati, both of Ohio

[73] Assignee: Xomox Corporation, Cincinnati, Ohio

[21] Appl. No.: 24,874

[22] Filed: Mar. 1, 1993

Related U.S. Application Data

[63] Continuation of Ser. No. 919,998, Jul. 27, 1992, abandoned, which is a continuation of Ser. No. 837,586, Feb. 18, 1992, abandoned, which is a continuation of Ser. No. 645,940, Feb. 13, 1991, abandoned, which is a continuation of Ser. No. 175,611, Mar. 24, 1988, abandoned, which is a continuation of Ser. No. 918,283, Oct. 14, 1986, abandoned.

[51] Int. Cl.⁵ ............................................. F16K 5/06
[52] U.S. Cl. ................................ 137/614.17; 137/630
[58] Field of Search ................ 137/556, 637.5, 614,4, 137/614.17, 630

[56] References Cited

U.S. PATENT DOCUMENTS

| | | | |
|---|---|---|---|
| 1,656,355 | 1/1928 | Huffmann | 137/637.5 |
| 1,841,050 | 1/1932 | O'Stroske | 137/637.5 |
| 2,608,374 | 8/1952 | Morehead | 137/556 X |
| 2,997,057 | 8/1961 | Toth | 137/614.11 X |
| 3,154,097 | 10/1964 | Wolff | 137/556 |
| 3,202,166 | 8/1965 | Butler | 137/164.11 X |
| 3,700,003 | 10/1972 | Smith | 137/637.5 X |
| 4,350,322 | 9/1982 | Mueller | 137/556 X |

*Primary Examiner*—John C. Fox
*Attorney, Agent, or Firm*—Frost & Jacobs

[57] ABSTRACT

A valve has an on-off control member disposed about an independently rotatable dynamic control member. The on-off control member, which interfaces with a sealing means, may be rotated to a closed position for shutoff purposes. Throttling operation is achieved by rotating the dynamic control member with the on-off control member in a stationary, fully open position which protects the sealing means. Bearings are placed between the dynamic control member and the on-off control member to permit the dynamic control member to rotate freely and accurately.

1 Claim, 2 Drawing Sheets

VALVE HAVING ROTATABLE CAGE

This application is a continuation on Ser. No. 07/919,998 filed Jul. 27, 1992, now abandoned, which is a continuation of Ser. No. 07/837,586 filed Feb. 18, 1992, now abandoned, which is a continuation of Ser. No. 07/645,940 filed Feb. 13, 1991, now abandoned, which is a continuation of Ser. No. 07/175,611 filed Mar. 24, 1988, now abandoned, which is a continuation of Ser. No. 06/918,283 filed Oct. 14, 1986, now abandoned.

TECHNICAL FIELD

The invention relates generally to valves and more particularly to rotatable valves having a cage structure for seal protection during dynamic fluid control applications. The invention will be specially disclosed in connection with an improved plug valve having an independently rotatable cage structure which permits the valve to function efficiently for both throttling and shutoff purposes.

BACKGROUND OF THE INVENTION

In the design of industrial fluid flow systems, it is standard engineering practice to select different types of valves for shutoff purposes than for dynamic fluid control purposes. Fluid shutoff valves are selected for their tight sealing characteristics so as to minimize fluid leakage. On the other hand, fluid control valves are selected for their ability to precisely control dynamic fluid flow characteristics, such as flow rate or pressure, through the fluid flow system. Unfortunately, the requirements for fluid shutoff and dynamic fluid control are often contradictory. Consequently, improvements in one or the other of the sealing and the dynamic fluid control characteristics is usually made only at the expense of the other. Thus, when both precise control and tight shutoff are needed, two separate valves are usually employed. For example, in a system designed for control of a highly corrosive process media, it is common practice to employ a globe valve for throttling purposes and a plug valve for shutoff purposes. These two different types of valves are structurally dissimilar.

Globe valves used for dynamic fluid flow control purposes, such as throttling, are frequently all metal structures which never fully closed in operation. A typical globe valve includes a tapered closure member which is axially moved toward and away from a seating position so as to provide a variable opening in the space between the closure member and the seat. Flow rate and pressure of the controlled process fluid are varied by axial positioning of the closure member with respect to the seat. Although such a valve structure has excellent control capabilities, it does not seal efficiently. Because all of the sealing surfaces are subject to erosion and direct fluid impingement, it is difficult to employ "soft" seat materials, such as plastics, which are necessary to achieve "bubble tight" sealing for long life. Hence, globe valves generally do not use "soft" seats in corrosion fluid applications and do not meet the sealing requirements needed for tight shutoff.

A plug valve, on the other hand, provides excellent shutoff capabilities. A typical plug valve includes a plug member which is rotatably disposed within a fluid flow passage extending through a valve body. The plug member also contains a through fluid passageway which is brought into and out of registry with the flow passage of valve body as the plug member is rotated. The plug member is normally rotated through a 90 degree range of movement between its fully open and fully closed positions. In order to prevent leakage between the valve body and the plug member, a sealing member in the form of a sleeve is fitted in the body about the plug. The sleeve, which is typically formed of a relatively soft, chemically inert plastic material, such as polytetrafluoroetheline, is aperatured in correspondence to the plug member when the plug member is in the fully open position. Significantly, the sleeve, which forms the seat of the plug valve, is protected from direct process fluid impingement by the plug member whenever the valve is in the fully open or fully closed positions.

It is possible to position the plug member intermediate the fully open and closed positions and to use a conventional plug valve for both shutoff and dynamic fluid control purposes. However, such use has serious limitations and disadvantages. First of all, the plug member is in tight fitting relationship with the sealing sleeve. This results in high friction between the plug and sleeve and places high torque requirements on the actuator used to rotate the plug member. It also follows that the plug member rotates relatively slowly and imprecisely.

Perhaps even more importantly, a plug valve is designed to operate only in fully open or fully closed positions where the sleeve is protected against the fluid flow of the process fluid flowing through the valve. When the plug member is rotated to an intermediate position, the sleeve (or seat) is exposed to direct fluid impingement of the process fluid. Such direct fluid impingement leads to erosion and deterioration of the sleeve and results in dimination of the sleeve sealing performance. Although the sleeve also is exposed to process fluid flow in conventional plug valve operation, such exposure occurs only during the brief transitory period of movement between the fully open and fully closed positions. Erosion is obviously much more pronounced during extended exposure, such as in a throttling application. The erosion problem is particularly acute when the process media is a high pressure slurry containing abrasive particles.

One relatively successful attempt at using a plug valve for both shutoff and dynamic fluid control is the caged plug valve. In the caged plug valves of the prior art, a metal cage assembly is located within the plug member and fixed relative to the valve body. This metal cage assembly serves to protect the sleeve from erosion in throttling applications by shielding the soft seat from direct impingement at the valve ports. The cage mechanism also serves to reduce turbulence and the cutting action of high velocity liquids, slurries, and gaseous vapors by providing a more direct, contoured flow path through the valve. While this type of caged plug valve offers substantial advantages over other prior art devices, it is not without its shortcomings. Like other plug valves of the prior art, the above-described caged plug valves has relatively high torque requirements and is relatively imprecise in its positioning capabilities. Furthermore, such caged plug valves do subject the seat to turbulent process media flow and process media cavitatation. This, of course, leads to seat erosion and spoils the tight shutoff sealing capabilities of the valve.

SUMMARY OF THE INVENTION

Accordingly, it is a primary object of the invention to provide a rotary valve assembly which is capable of both tight shutoff and dynamic fluid control.

It is another object of the invention to provide a caged valve assembly having improved protection of its sealing elements during dynamic fluid flow applications.

Yet another object of the invention is to provide a low torque, high precision fluid control member in a valve assembly capable of bubble-tight sealing.

Still another object of the invention is to provide a valve which eliminates backlash problems in the position control of a throttling member.

Another object of the invention is to provide a caged valve which eliminates uncontrolled rotation of the cage resulting from manufacturing and assembly tolerances.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects and in accordance with the present invention as described herein, a rotatable cage valve is provided having a dynamic fluid control member which is rotatably independent of the on-off fluid control member. The valve assembly includes a valve body having an inlet, an outlet and an internal fluid flow passage extending therebetween. A dynamic fluid control member is rotatably fitted in the body. This dynamic control member is movable between open and closed positions to selectively control the flow of fluid through said internal flow passage in accordance with the relative angular position of the dynamic control member. on-off control member is disposed within the body and is rotatable independently of the dynamic control member. The on-off control member forms the primary seal for the valve. In all but the shutoff position, the on-off control member remains stationary with throttling being controlled by the dynamic control member.

In accordance with another aspect of the invention, the on-off control member is operative to protect the sealing member from direct impingement of a process media flowing through said internal fluid flow passage.

In another aspect of the invention, the dynamic control member is disposed within the on-off control member, and the dynamic control member and the on-off control member are rotatable about a common axis.

In another aspect of the invention, bearing members are located between the dynamic and on-off control member.

According to one specific aspect of the invention, the bearing members are formed of a fluorinated hydrocarbon polymer.

In another aspect of the invention, means are provided for applying a torque to the dynamic control member for effectuating movement thereof. A position control means is also provided indicating the relative angular position of the dynamic control member relative to the body. The position control means is mechanically uncoupled from said torque applying means.

Still other objects of the present invention will become readily apparent to those skilled in the art from the following description wherein there is shown and described a preferred embodiment of the invention, simply by way of illustration, of one of the best modes contemplated for carrying out the invention. As will be realized, the invention is capable of other different embodiments, and its several details are capable of modifications in various, obvious aspects all without departing from the invention.

BRIEF DESCRIPTION OF THE DRAWINGS

The accompanying drawings incorporated in and forming a part of the specification illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
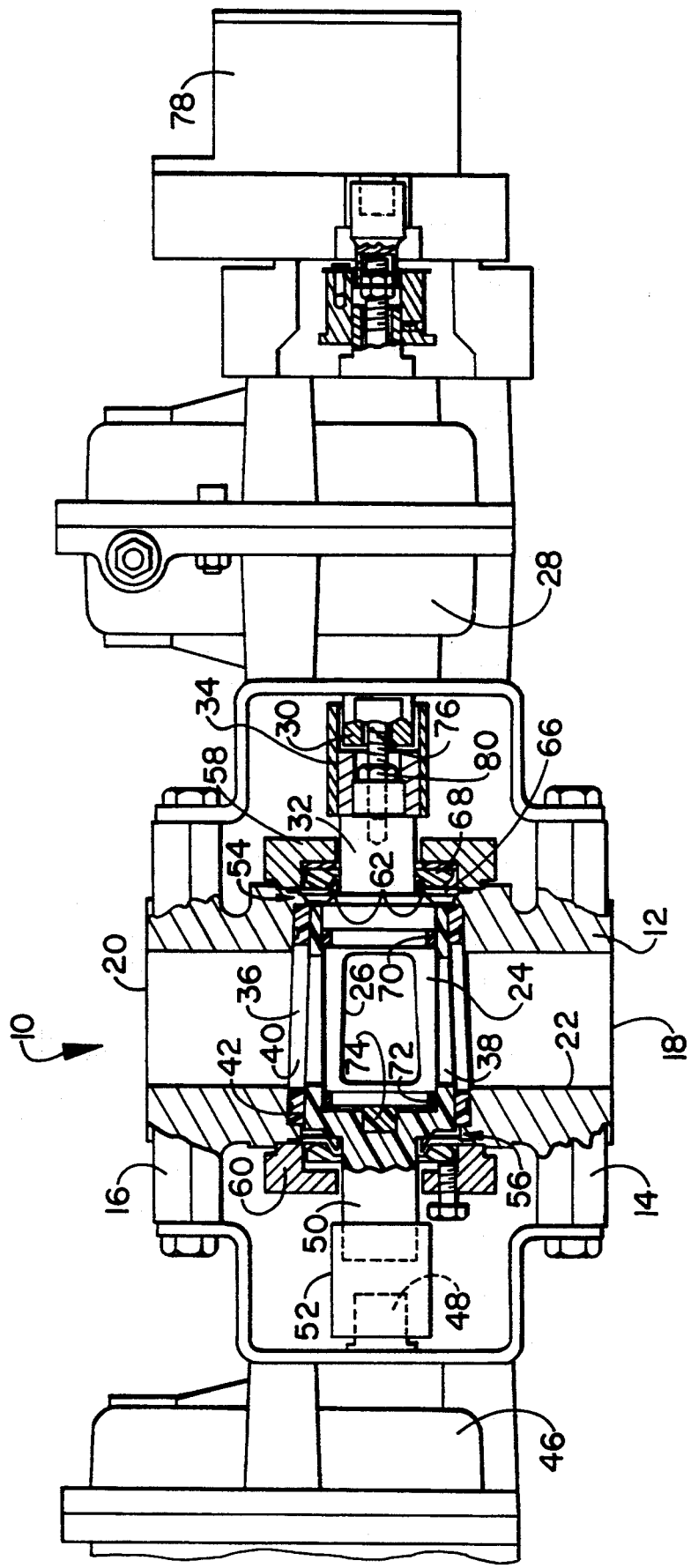
FIG. 1 is an elevational view, partially in cross-section, of a valve assembly constructed in accordance with the principles of the present invention.
Figure 2:
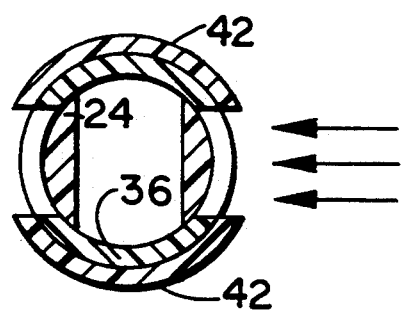
FIG. 2 is a schematic representation depicting the relative angular positions between the dynamic control member, the on-off control member and sealing member in the FIG. 1 position of the assembly.
Figure 3:
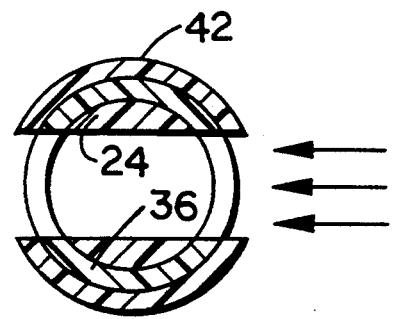
FIG. 3 is a schematic view similar to FIG. 2, but showing the dynamic control member rotated ninety degrees from the fully closed FIG. 2 position to a fully open position.
Figure 4:
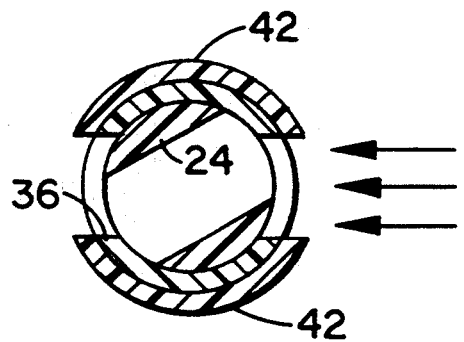
FIG. 4 is a schematic view similar to FIGS. 2 and 3, but showing the dynamic control member rotated to a throttling position intermediate its fully open and fully closed positions.

Turning now to the drawings, FIG. 1 shows a rotary valve 10 constructed in accordance with the principles of the present invention. The specifically illustrated valve 10 is a plug valve having a body 12 with flanges 14 and 16 on its opposite ends. The body 12 has a fluid flow inlet 18 and a fluid flow outlet 20 centrally disposed within the flanges 14 and 16, respectively. An internal fluid flow passage 22 extends through the body 12 between the inlet 18 and outlet 20.

Fluid flow through the internal flow passage 22 is controlled and selectively throttled by dynamic closure member 24, specifically illustrated as a rotary cage member. The cage member 24 has a through passageway 26 which is selectively brought into and out of registry with the internal flow passage 22 by rotating the cage member 24 relative to the body 12. Such rotation is effectuated in the illustrated valve by a vane-type actuator 28, which actuator 28 transmits torque through an output shaft 30 coupled to a valve actuating shaft 32 through a coupling 34. The valve actuating shaft 32 is rigidly connected to the cage member 24 to cause the cage member 24 to rotate with the shaft 32.

As those skilled in the art will readily appreciate, the output shaft 30 from the actuator 28 is rotated in response to differential fluid pressure applied to opposite sides of a non-illustrated vane (sometimes called a paddle) located within the vane actuator 28. As shown in the illustration of FIG. 1, the cage member 24 is positioned in its fully closed position. By rotating the cage member 24 ninety degrees, the through passageway 26 of the cage is brought fully into alignment with the internal flow passage 22 to position the cage member 24 in its fully open position.

Figure 5:
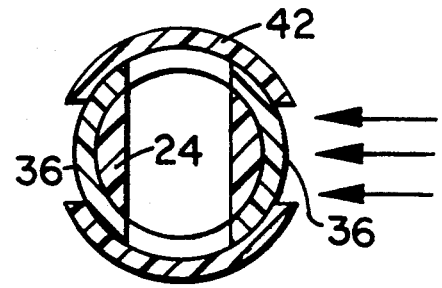
FIG. 5 is a schematic view similar to FIGS. 2–4 depicting both dynamic and on-off control members rotated to their closed positions.

In accordance with one of the principles of the present invention, the cage member 24 is rotatably fitted within a plug 36, which plug 36 serves as the primary sealing member for the valve assembly 10. The illustrated form of plug is a generally hollow frustoconical structure having walls which are apertured in correspondency with the flow passage 22 so as to permit the unobstructed flow of a process fluid through the internal flow passage 22 when the plug 36 is in the position shown in FIGS. 1, 2, 3 and 4. However, as the plug 36 is rotated, the apertures, identified in the drawings as apertures 38 and 40, are moved out of alignment with the passageway 22. As readily apparent from the depiction of FIG. 5, the plug 36 is rotatable to a fully closed position to completely stop flow through internal passageway 22. However, for reasons which will become apparent from the following description, the plug 36 typically remains stationary in the positions of FIG. 1–4, and in all but shutoff operation.

Referring once again to FIG. 1, it will be seen that the plug 36 is fitted within a sleeve 42 which extends across the passageway 22 and provides a seal between the valve body 12 and the plug 36. The apertures of this sleeve 42 also correspond to the passageway 22. In the preferred form of the invention, this sleeve 42 is formed of a fluorinated hydrocarbon material, such as polytetrafluoroethylene, which is chemically inert to virtually every process fluid. However, since such seals may become eroded from direct process media impingement, it is important to protect the sleeve during all operating positions of the valve. From viewing FIGS. 2–4, it is seen that the illustrated plug fully protects the sleeve in all operating positions of the cage member 24, irrespective of the cage member's angular position. Aside from the seals (and bearing discussed below), all other components of the valve assembly are formed of metal which is resistant to erosion by the process media.

The plug 36 is rotatable within the body about an axis coincident to that of cage member 24. Angular rotation of the plug 36 is effectuated in a manner analogous to that of the cage member 24. A second vane actuator 46, positioned on the opposite side of the valve body 12 with respect to actuator 28, has an output shaft 48 which transmits torque to an actuating shaft 50 for the plug 36 through a coupling 52. The actuating shaft 50 is rigidly connected to the plug 36 so that the plug rotates with the shaft 50. Like the vane actuator 28, vane actuator 46 also rotates in response to a differential fluid pressure across a vane (not shown) rotatably mounted within the actuator 46.

The actuating shafts 32 and 50 for the cage member 24 and plug 36, respectively, extend out opposite sides of the valve body 12 through access openings 54 and 56. Each access opening 54,56 is closed by a valve cover. Valve access cover 58 is secured to the valve body 12 and fitted within access opening 54, while valve cover 60 is simultaneously secured and fitted within access opening 56. A diaphragm seal 62 is interposed between the body 12 and cover 58 to prevent leakage of the process fluid through access opening 56. The diaphragm 62, which is preferably formed of a fluorinated hydrocarbon or other material inert to the process media, has a central aperture through which the actuating shaft 32 extends. The shaft 32 is compressingly contacted by the interior wall of a V-shaped groove formed about the periphery of the diaphragm's (62) central aperture. A delta ring 64 supported on a shoulder of the cage member 24 is positioned in the V-shaped groove of the diaphragm 62 to compressingly urge the interior wall of the V-shaped groove in sealing relationship against the shaft 32. A metal diaphragm 66 is placed exteriorly of the diaphragm 62. The diaphragm 66 is larger than the diaphragm 62 and is received in a separate counterbore of the valve body 12 so as to protect the diaphragm 62 from damage when the valve access cover 58 is tightened.

A thrust collar 68 having an obliquely oriented underside surface is fitted on the metal diaphragm 66 with the obliquely oriented surface in engagement with the outside wall of the V-shaped groove. The thrust collar 68 acts to apply a radially inward sealing pressure against the outside wall of the V-shaped groove, and this sealing pressure is transmitted through the delta ring 62 to provide a sealing pressure against the actuating shaft 32. Thrust is adjustably applied to the thrust collar 68 to vary the sealing pressure about the shaft 32. This is achieved through a series of axially adjustable bolts (not shown) which extend through the cover 58.

A similar adjustable sealing arrangement is provided in the access opening 56 for the plug 36. Since the sealing arrangement for the plug in access opening 56 is virtually identical to that of the cage member 24 in access opening 54, a detailed description of the former sealing arrangement is omitted in the interests of brevity. However, attention is directed to adjusting bolt 69 extending through cover 60 for adjusting the sealing pressure about shaft 50. The illustrated adjusting bolt 69 is one of three such bolts extending through cover 60. Three similar non-illustrated adjusting bolts also extend through cover 58.

According to another aspect of the invention, the cage member 24 advantageously contacts the plug 36 only about three small bearing surfaces. Two of these bearing surfaces result from bearings 70 and 72 which are circumferentially placed about the cage member 24 on opposite sides of the passageway 26. The remaining bearing is a solid "button-type" bearing 74 separating the respective axial end surfaces of the cage member 24 and plug 36. Like the sleeve 42, the bearings 70, 72 and 74 are preferably formed from fluoronated hydrocarbon polymer, such as polytetrafluoroethlene. Hence, while the plug 36 remains tightly fitted against the sleeve 42 to establish a tight "bubble tight" seal, the cage 24 is rotated in a relatively low friction fit against the cage assembly. As a consequence of this relatively low friction fit, the cage member 24 may be rotated with relatively little torque and to substantially greater accuracy than plugs in conventional plug valves having equivalent sealing capabilities.

In order to further improve the accuracy with which cage member 24 may be rotated, the position control mechanism for the plug member 24 is mechanically decoupled from the torque transmitting elements of the valve. For example, in the illustrated embodiment, the output shaft 30 of vane actuator 28 is hollow. All of the torque is applied from output shaft 30 to the valve actuating shaft 32 through coupling 34. The actuating shaft 32 is also connected to a position control shaft 76 which extends through the output shaft 30 in concentric relationship thereto. The position control shaft extends to a positioner 78 mounted on the vane actuator 28. The positioner 78 of the preferred embodiment is a commercially available positioner. The positioner 78 positions the angular position of the cage member 24 relative to the body 12 under the control of a feedback control system. In the illustration of FIG. 1, the position control shaft 76 is threadably received in a threaded opening in the outboard axial end of actuating shaft 32. A locknut 80 secures the position control shaft 76 to the actuating shaft 32. Since the position control shaft carries virtually no torque, light-weight securement means between the position control and actuating shafts are satisfactory to provide accurate position control of the cage member 24.

As noted above, the present invention is capable of throttling a process media without exposing any portion of the sleeve 42 to direct fluid impingement. By rotating the cage member 24 to an intermediate position and simultaneously positioning the plug 36 to a fully open position, the process media may even be throttled while fully protecting all parts of the sleeve 42 from fluid impingement. It will also be appreciated that the illustrated manner of controlling the cage member 24 and plug 36 eliminates the poorly controlled rotations of prior art designs. Such poorly controlled rotations resulted from high torque requirement and backlash in the devices.

In summary, numerous benefits have been described from employing the concepts of the invention. The valve of the invention permits throttling and other dynamic fluid control application with only metal surfaces exposed to the media in a valve capable of "bubble tight" sealing. Moreover, the dynamic control member of the invention can be rotated with minimal torque, allowing highly precise, low powered, controlled rotation of that dynamic control member. Furthermore, the on-off control member may be closed independently of the dynamic control member to achieve tight sealing. Hence, a single valve may be used for both throttling and fluid shutoff purposes.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the principles of the invention are not limited to plug valves. Also, other types of rotary valve and/or actuators may be used. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method of throttling the flow of a process media through a valve assembly of the type having a valve body with an inlet, an outlet, and an internal flow passage extending therebetween, a plug member rotatably disposed within the body for selectively controlling the flow of a process media through internal flow passage, a sealing sleeve interposed between the valve body and the plug member for providing a fluid seal therebetween, the plug member being configured to fully protect the sealing sleeve from direct impingement of a process media flowing through the internal flow passage when the plug member is in a selected position, and a cage member rotatably disposed within the plug member, said cage member being operative to controllably vary the rate of fluid flow through the internal passageway in accordance with its relative angular position with respect to the valve body, said method comprising the steps of:

a) rotating the plug member with a first actuator to a first position fully protecting the sealing sleeve from direct fluid impingement from a process media and permitting the flow of the process media through the internal flow passage while the sleeve is fully protected from direct fluid impingement from the process media; and rotating the cage member with a second actuator mechanically decoupled to the first actuator to throttle the flow of the process media through the internal flow passage while the sealing sleeve is fully protected from direct fluid impingement from the process media whereby the rate of process media flow through the internal passage is controllably varied without exposing the sealing sleeve to direct fluid impingement of the process media.

* * * * *